United States Patent
Pasquer et al.

(10) Patent No.: US 7,108,224 B2
(45) Date of Patent: *Sep. 19, 2006

(54) AIRCRAFT ENGINE REAR SUSPENSION WITH THRUST RECOVERY

(75) Inventors: Felix Pasquer, Lieusaint (FR); Philippe Loewenstein, Saint Arnoult le Bourg (FR); Marc Tesniere, Champcueil (FR)

(73) Assignee: SNECMA Moteurs, Paris (FR)

( * ) Notice: Subject to any disclaimer, the term of this patent is extended or adjusted under 35 U.S.C. 154(b) by 0 days.

This patent is subject to a terminal disclaimer.

(21) Appl. No.: 10/839,133

(22) Filed: May 6, 2004

(65) Prior Publication Data

US 2004/0251380 A1    Dec. 16, 2004

(30) Foreign Application Priority Data

May 27, 2003    (FR)    ................................. 03 06437

(51) Int. Cl.
*B64D 27/00* (2006.01)
(52) U.S. Cl. .......................................... 244/54; 60/797
(58) Field of Classification Search ................. 244/54; 60/796, 797; 248/554
See application file for complete search history.

(56) References Cited

U.S. PATENT DOCUMENTS

2003/0066928 A1 * 4/2003 Brefort et al. ................. 244/54

FOREIGN PATENT DOCUMENTS

| EP | 1 136 355 | | 9/2001 |
| EP | 001136355 A1 | * | 9/2001 |
| FR | 2 830 515 | | 4/2003 |
| FR | 2830515 | * | 4/2003 |

OTHER PUBLICATIONS

U.S. Appl. No. 10/838,243, filed May 5, 2004, Pasquer et al.
U.S. Appl. No. 10/839,133, filed May 6, 2004, Pasquer et al.
U.S. Appl. No. 10/843,306, filed May 12, 2004, Pasqier et al.

* cited by examiner

*Primary Examiner*—Timothy D. Collins
(74) *Attorney, Agent, or Firm*—Oblon, Spivak, McClelland, Maier & Neustadt, P.C.

(57) ABSTRACT

A suspension of the turbo fan engine to an aircraft pylon, includes a fitting arranged to be attached to a pylon, a lever fastened in its central portion to the fitting via a linking device with a pivot pin. Two thrust rods are each connected by an end to the lever and including at the other end of the fastening device to the engine. The linking device is composed on the central portion of the lever, of two parallel branches apart from one another, and on the fitting, of a central fastening tab, whereas the fastening tab and both branches are held together by dint of the pivot pin.

16 Claims, 3 Drawing Sheets

AIRCRAFT ENGINE REAR SUSPENSION WITH THRUST RECOVERY

The present invention relates to the suspension of propulsion engines from an aircraft structure. It relates in particular to a rear suspension with thrust links including means intended to maintain the suspension in case of breakage of one of its parts.

A propulsion engine may be installed at various locations in the aircraft, for instance suspended from a pylon integral with the structure thereof. It may be suspended under the wings, attached to the fuselage or installed in the tail unit by fastening means. The function of these fastening means consists in transmitting mechanical loads between the engine and the aircraft structure. The loads to be taken into consideration are oriented along the three main directions. These are notably the weight of the engine, its thrust and the lateral aerodynamic loads. The loads to be transmitted also include the rotation torque around the axis of the engine. Besides, these means must absorb the deformations undergone by the engine during the various phases of the flight by reason notably of the dimensional variations due to thermal expansions or contractions.

A suspension mode, for example, in the case of a blower-type turbo engine, consists in fastening the engine to a pylon integral with the wing structure of the aircraft using a front suspension or attachment and rear suspension or attachment. The front suspension is fastened in particular to the outer casing of the blower and the rear suspension to the exhaust casing of the primary flow.

According to a configuration known, the front attachment is arranged to ensure transmission of the vertical and tangential mechanical loads between the engine and the aircraft. The rear attachment is arranged for letting through the mechanical loads along the same directions, as well as to enable transmitting the engine torque around the axis of the turbo engine and thrust. The latter is transmitted via two thrust bars attached, at the front, to the base of the blower casing on both sides of the longitudinal axis and, at the rear, by means of the rear suspension of the engine.

The present invention relates to the rear suspension with thrust transmission means.

As it is known, such a suspension includes more precisely a fitting which is fastened to a structure element of the pylon, designated as pylon, both thrust bars or rods connected to the fitting via a lever, as well as a set of rods hinged on the exhaust casing of the primary flux. In order to remedy the problems cropping up in case of breakage of a part, such as one of the rods or the lever, ensuring transmission of the thrust loads between the engine and the aircraft structure, the suspension is always provided with safety means intended to replace the faulty part.

The patent application EP 1136355 describes a thrust transmission device with means forming a link with a certain clearance between each rod and the fitting. These means enable to transmit the thrust loads in case of breakage of one part of the device. The fitting includes, at the front, a central yoke whereon the lever is hinged. Both rods are hinged by first pivot pins at both ends of the lever. The fitting comprises as a safety means two additional lateral lugs or tabs, on both sides of the central yoke. These tabs accommodate the connecting means, with a certain clearance, of each thrust rod. The links with a certain clearance are each composed of a pivot pin, parallel to the first axis, running simultaneously through the lateral tab and the yoke of the corresponding rod. The pivot pin is installed with a certain clearance on the fastening tab of the fitting. In normal operation, the loads are transmitted via the rods, the lever, the central yoke of the fitting, and the fitting properly speaking. In case of breakage of one of the rods, for instance relative displacement occurs, which causes absorption of the clearance of the other rod. The link becomes rigid and is able to transmit the loads.

This device fulfils perfectly the safety function devolved thereupon.

Other arrangements have been suggested for transmitting loads in case of accidental breakage of one of the parts forming the thrust recovery device.

The patents EP 564126, EP 879759 or EP 805108 also describe such devices using a lever linking both rods to the rear fitting via a central joint. The latter includes a pivot pin oriented radially with respect to the longitudinal axis of the engine. The pivot axis runs through the lever and a double central yoke interconnected with the fitting. These patents suggest various means for transmitting the thrust in case of abnormal operation.

The applicant has set as a target to improve the devices of the previous art from a mechanical viewpoint as well as that of the costs of manufacture.

According to the invention, the suspension of the turbo engine to an aircraft pylon, including a fitting arranged to be attached to a pylon, a lever fastened in its central portion to the fitting via a linking means with a pivot pin, and two thrust recovery rods each connected by an end to the lever and including at the other end of the fastening means to the engine, is characterised in that said linking means is composed on said central portion of the lever, of two parallel branches apart from one another, and on the fitting, of a central fastening tab, whereas the fastening tab and both branches are held together by dint of said pivot pin.

The solution of the invention with respect to the realisations of the previous art mentioned above has the advantage of providing an additional safety in case of any lever failure. If for example a crack occurs in the lever at one of the branches of the central portion, the load transmission path runs through the other branch.

The solution also suggests a manufacturing advantage. The fitting, because of their complex geometry, are parts difficult to be machined. By replacing the yoke on the fitting with a simple single-plane tab, the costs of manufacture are reduced. It appears that the solutions of the previous art mentioned above do not take this problem into consideration.

Advantageously, the central portion of the lever is in the form of a biplane. In particular, the lever includes on both sides of its central portion, a fastening tab co-operating with a lateral pivot pin, each with a yoke interconnected with the rear end of the rods. This way, the lever also exhibits simple geometry.

According to another characteristic, the fitting includes on both sides of the central fastening tab, a lateral fastening tab co-operating with a standby connection with the rear end of each rod. Advantageously, the standby connection is formed of a pivot pin installed with a certain clearance in its housing. In particular, the lateral pivot pins and the pivot pins of the standby connections are installed on the same yokes at the rear end of the rods.

This embodiment of the fittings is particularly advantageous since the central fastening tab and both lateral fastening tabs may be machined in the same plane.

The costs of manufacture of the fitting are reduced further since its contour is made of a single pass of the machining tool.

One also obtains a part whereof the geometry guarantees optimal mechanical handling since the concentration phenomena of the loads in the machining jointing zones are reduced.

Other characteristics and advantages will appear when reading the following description, accompanied by the appended drawings whereon:

Figure 1:
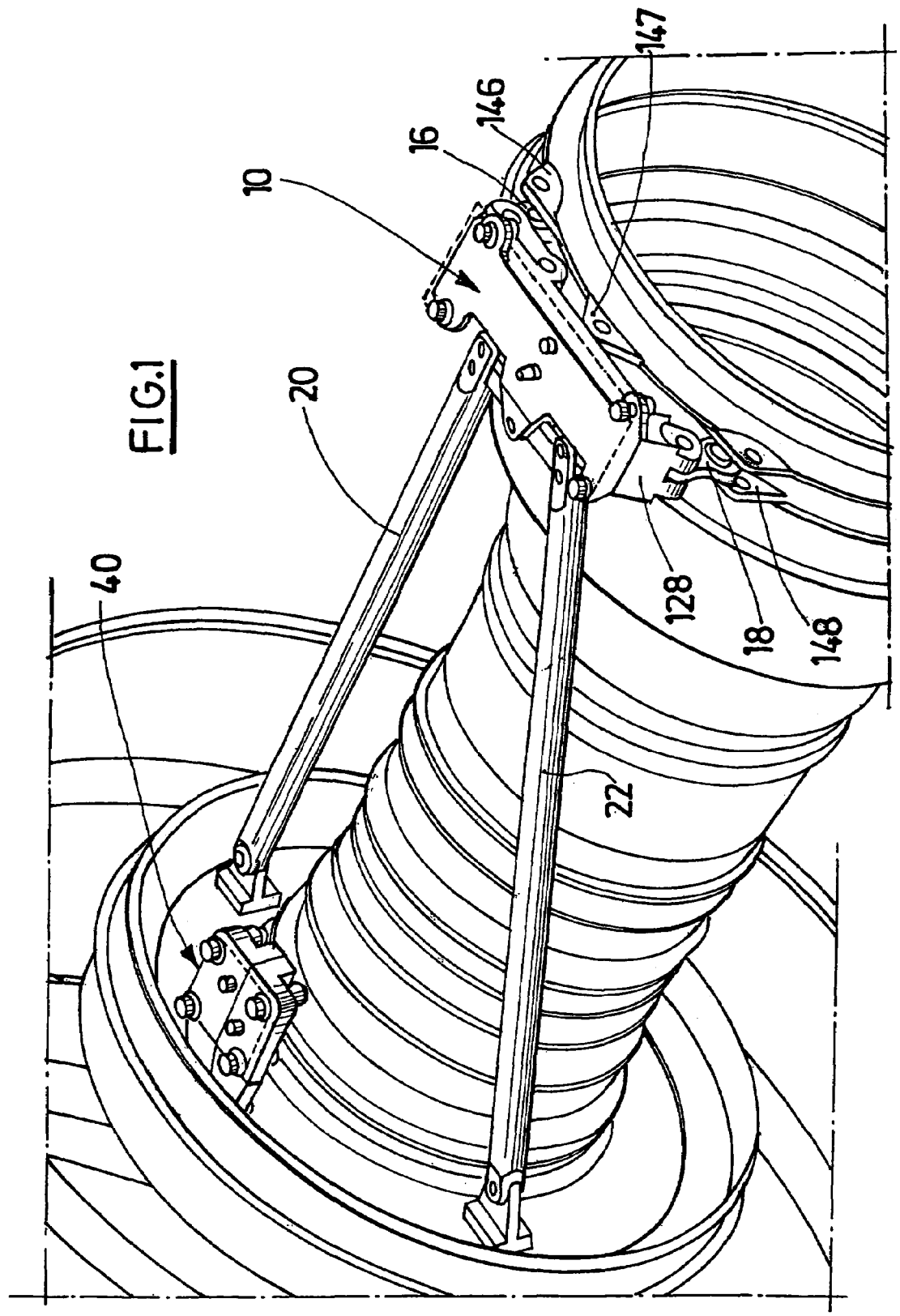
FIG. 1 represents an assembly overview of an engine to an aircraft pylon.

FIG. 1 is a three-quarter rear view of a turbo reactor 1 equipped with its fastening means to an aircraft pylon which is not represented. It may be notably the fastening system of a wing to an aircraft. According to this fastening mode, the engine includes an attachment device 40 at the front of the engine, fastened to the external casing of the blower. It also includes a rear attachment means 10, fastened to the exhaust casing of the primary flux. The thrust transmission device is provided by two bars 20 and 22 arranged longitudinally on both sides of the engine and fastened to the ends, on the one hand at the base of the blower casing and on the other hand to the rear attachment.

Figure 2:
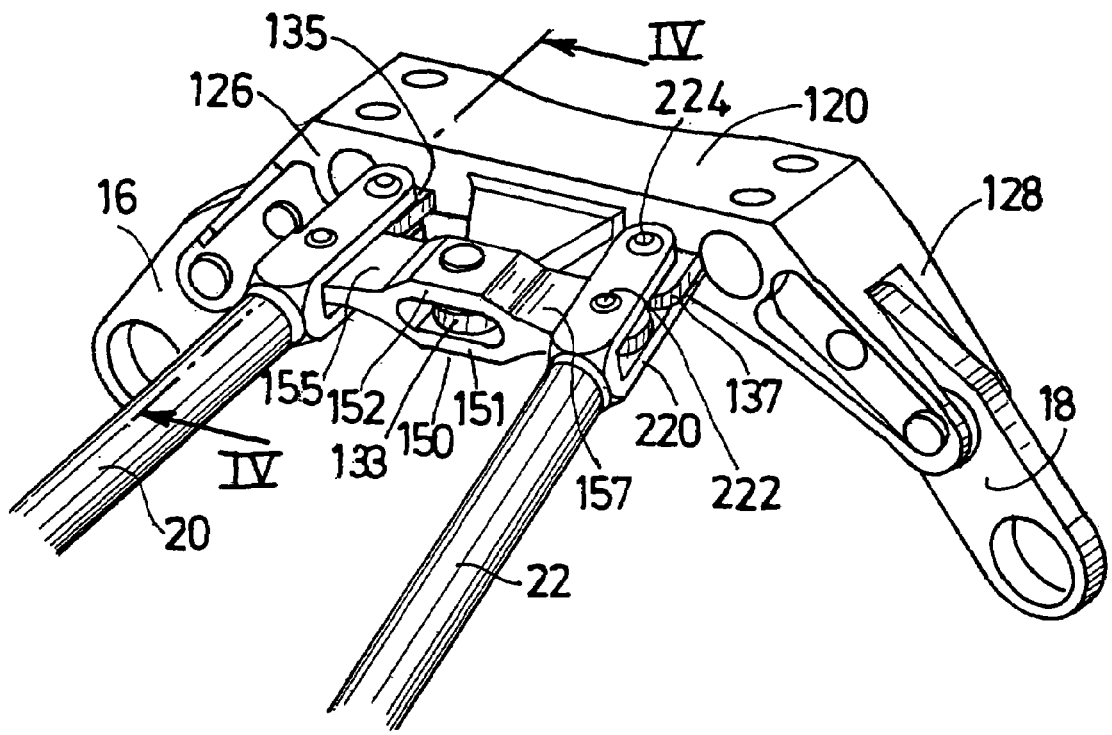
FIG. 2 is a perspective view of the assembly device of the engine according to the invention.
Figure 3:
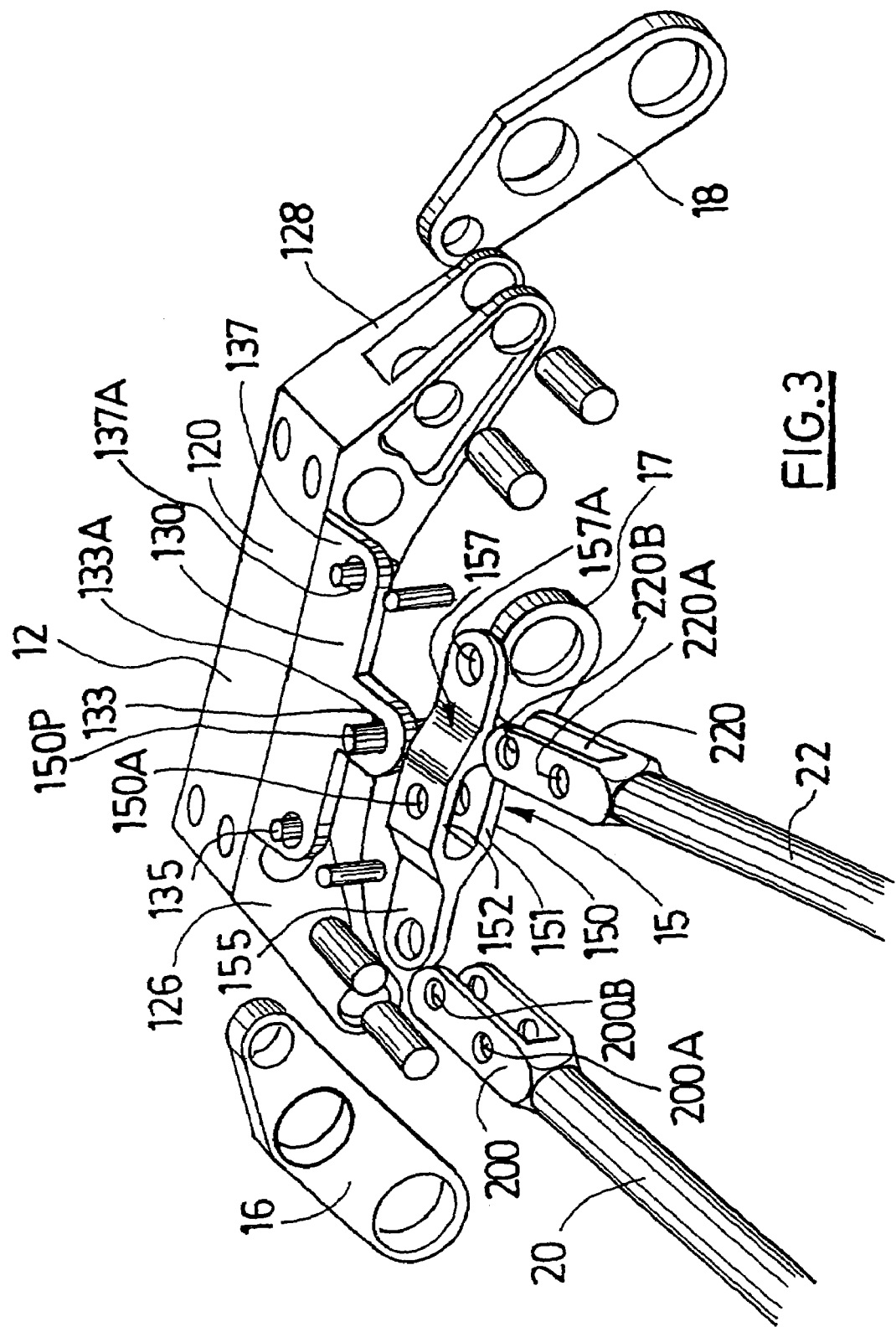
FIG. 3 represents the device of FIG. 2 as an exploded view.

The present invention relates to the rear attachment described below in relation to FIGS. 2 and 3. The exploded view of FIG. 2 does not represent the assembly sockets of the various pins. The attachment 10 is composed of an upper fitting 12 and of three rods 16, 17 and 18 connecting the fitting 12 to lugs or yokes interconnected with the exhaust casing 146, 147, 148 and arranged circumferentially. Finally, these lugs are gathered into a single lower fitting.

The upper fitting is composed of a beam 120 with, here, four housings to let through bolts or screws wherewith the fitting is interconnected with the aircraft pylon. The beam is substantially rectangular in shape; it is laid out transversally with respect to the longitudinal axis of the engine. The beam is extended in the transversal direction, by two yokes 126 and 128, whereon the rods 16 and 18 respectively are hinged. A third yoke 127 arranged under the beam between both other yokes ensures connection with the rod 17.

The fitting 12 includes at the front, the front being defined with respect to the thrust direction of the engine, a flat part 130. This part 130 defines three fastening tabs: 133, 135 and 137, i.e. a central tab 133 and two lateral tabs 135 and 137 on both sides of the central tab. The three tabs are drilled perpendicular to the plane of the part with the bores 133A, 135A and 137A. Both thrust rods 20 and 22 are oriented to the front from the fitting 12 on both sides of the longitudinal axis of the engine. The rear ends of both rods 20 and 22 are each provided with an elongated yoke 200 and 220 with two bores, 200A, 200B and 220A, 220B respectively, running through the branches. The rods co-operate with a lever 15 arranged crosswise, parallel to the fitting.

This lever 15 includes a central portion 150 with two branches 151 and 152 parallel, apart from one another in order to form a biplane. A bore 150A runs through this biplane. The lever is connected to the fitting via the connection means formed of a pivot axis running through both branches 151, 152 and the central tab arranged between them.

The lever also comprises two tabs 155 and 157 on both sides of this biplane 150, each with a bore, 155A and 157A. The bore axes of both tabs and of the biplane are parallel to one another.

Both yokes 200 and 220 connect the rods 20 and 22 simultaneously to the lever and to the fitting via pivot axes housed in the bores. However, only the connection with the lever is active. In order to ensure safe transfer of the loads between the engine and the aircraft structure, the connection between both rods 20 and 22 and the lateral fastening tabs of the fitting 135 and 137 is in standby. Thereby is meant a connection which in normal operation of the thrust device remains inactive and does not transmit any load. In case of accidental failure, the connection becomes active and replaces the faulty part.

Advantageously, the standby connection consists of a pivot pin running through both branches of the yoke and the fastening tab, installed with a certain clearance. As long as the clearance is not absorbed by relative movement between the yoke and the tab, no load is transmitted from one to another.

Figure 4:
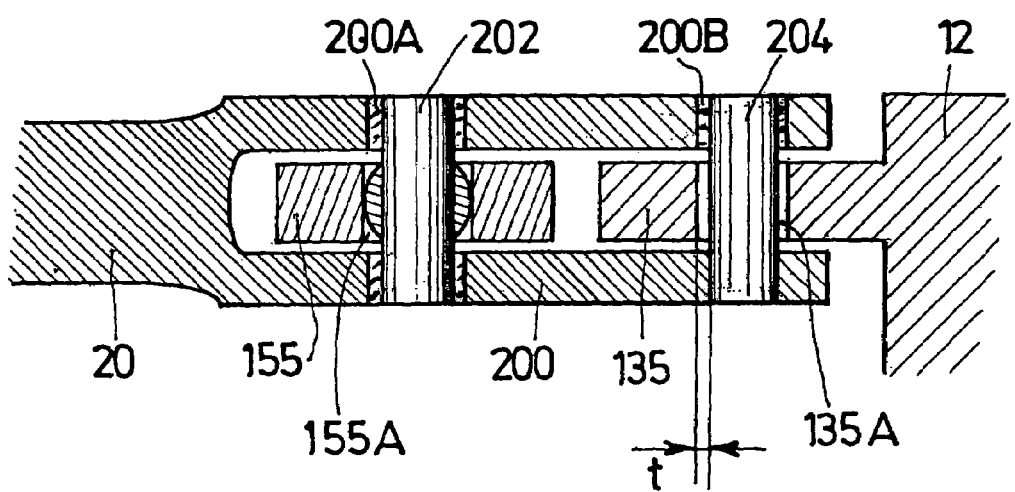
FIG. 4 is a sectional view of FIG. 2 along direction IV—IV.

This is shown on FIG. 4 which represents a sectional view of the connections of the rod 20 with the lever and the fitting. The yoke 200 connects the rod 20 to the tab 155 via a pivot pin 202. The socket on the tab 155 in the bore 155A has a spherical surface to form a ball joint. The yoke 200 connects the rod to the tab 135 of the fitting via a second pivot pin 204. The latter is installed with a clearance in the bore 135A. This clearance is sufficient so that no load is transmitted via this connection in normal operation of the suspension.

Similarly, the rod 22 is connected to the fitting 220 to the tab 157 via a pivot pin 222 installed with a ball joint as the pin 202. The yoke 220 connects the rod to the lateral tab 137 of the fitting via a second pivot pin 224. The latter is installed with a certain clearance in the bore 137A of the tab 137. This clearance is preferably identical to that which is provided between the pin 204 and its housing in the bore 135A.

The device operates as follows.

In normal operation, the traction loads exerted by the engine are distributed over both rods 20 and 22 which transmit them to the lever by the hinged connections. By reason of the assembly of the pivot pins on the lever, only the traction and compression loads are transmitted along the direction of the rods. The lever 15 transmits in its turn the loads to the fitting via the connection means formed of the pivot pin 150P running through the biplane 151-152 and the central tab 133.

If the rod should fail, the load exerted by the other rod drives a rotation movement around the pivot 150/133 and the absorption of the clearance at the corresponding tab. The connection becomes rigid and replaces the faulty connection.

If the lever or the connection via the central tab should fail, both rods then transmit the load directly to the fitting via both lateral tabs.

The invention claimed is:

1. A suspension of a turbo engine to an aircraft pylon, including a fitting arranged to be attached to a pylon, a lever fastened in its central portion to the fitting via a linking means with a pivot pin, and two thrust rods each connected by an end to the lever and including at the other end of the fastening means to the engine, wherein said linking means is composed on said central portion of the lever, of two parallel branches apart from one another, to form a biplane, a bore running through said biplane, and on the fitting, of a central fastening tab arranged between both parallel branches, whereas the central fastening tab and both branches are held together by dint of said pivot pin.

2. A suspension according to claim 1, wherein the lever includes on both sides of its central portion, a fastening tab co-operating with a lateral pivot pin, each with a yoke at the rear end of the rods.

3. A suspension according to claim 2, wherein the fitting includes on both sides of the central fastening tab, a lateral fastening tab co-operating via a standby connection with the rear end of each rod.

4. A suspension according to claim 3, wherein the standby connection is formed of a pivot pin installed with a certain clearance in its housing.

5. A suspension according to claim 4, wherein the lateral pivot pins and the pivot pins of the standby connections are installed on the same yokes at the rear end of the rods.

6. A suspension for a turbo engine, comprising:
a fitting with a tab;
a lever including a central portion with two parallel branches apart from one another so as to form a biplane, said central portion defining a bore running through said biplane, wherein said tab of said fitting is positioned between said two parallel branches;
a pivot pin running through said two parallel branches and said tab so as to mechanically couple said fitting to said lever, and
two rods, each having a first end with a first portion connected to said lever and a second portion connected to said fitting.

7. A suspension according to claim 6, wherein said tab of said fitting is a central tab positioned between two lateral tabs of said fitting.

8. A suspension according to claim 7, wherein said central tab and said lateral tabs are drilled perpendicular to a plane of the fitting.

9. A suspension according to claim 7, wherein said central tab is located on a portion of said fitting that is flat.

10. A suspension according to claim 7, wherein each of said two rods is configured to be mechanically coupled at a second end to a front of said turbo engine.

11. A suspension according to claim 10, wherein said lever has a lateral tab on each side of said central portion, each of said rods being connected to one of said lateral tabs of said lever.

12. A suspension according to claim 11, wherein connections between said rods end said lateral tabs of said lever are active.

13. A suspension according to claim 12, wherein each of said rods is connected to one of said lateral tabs of said fitting.

14. A suspension according to claim 13, wherein connections between said rods and said lateral tabs of said fitting are in standby.

15. A suspension according to claim 14, wherein each of said connections between said rods and said lateral tabs of said fitting include a pin running through an end of each rod and through said one of said lateral tabs of said fittings.

16. A suspension according to claim 15, wherein said pin is dimensioned so as to leave a clearance between said pin and said one of said lateral tabs of said fittings.

* * * * *